July 8, 1969  TOMOAKI YOSHIOKA ETAL  3,454,397
STEERING COLUMN FOR A MOTOR VEHICLE
Filed Jan. 22, 1968

INVENTOR.
Tomoaki Yoshioka
Yasuo Sato

United States Patent Office 3,454,397
Patented July 8, 1969

3,454,397
STEERING COLUMN FOR A MOTOR VEHICLE
Tomoaki Yoshioka, Saitama-ken, and Yasuo Sato, Tokyo, Japan, assignors to Kabushiki Kaisha Honda Gijutsu Kenkyusho, Saitama-ken, Japan
Filed Jan. 22, 1968, Ser. No. 699,588
Claims priority, application Japan, Jan. 30, 1967, 42/7,381
Int. Cl. B62d 1/18
U.S. Cl. 74—492      9 Claims

ABSTRACT OF THE DISCLOSURE

A steering column constituted by first and second axial shaft portions connected together by a casing containing a plastically deformable material.

BRIEF SUMMARY OF THE INVENTION

This invention relates to a steering column for a motor vehicle and in particular to a steering column which has energy absorbing characteristics for the purpose of lessening the impact force on a person who may strike the steering wheel during an accident such as in a collision or the like.

Such energy absorbing steering columns are of widespread interest at present for the safety protection which they offer.

An object of the invention is to provide such a steering column which is reliable and of simple construction.

According to the invention the steering column is comprised of first and second axial shaft portions which are connected together by an axially compressible casing which forms an enclosure for a plastically deformable material which resists axial compression of the column up to a limit value beyond which the material is deformed and the column is compressed.

Such compression force is usually produced on the column, by a person striking the steering wheel with great impact, as in a collision. By virtue of the compression of the plastically deformable material, and the resulting energy absorption, the impact force on the person is substantially lessened as compared to a rigid steering column. By referring to the material as "plastically deformable," we mean those materials which are substantially rigid until a force of a particular magnitude is applied to them which causes them to be permanently deformed.

In one advantageous embodiment of the invention, the casing is constituted as a tubular body slidably housing a piston therein, the body and piston being connected to a respective shaft portion. The piston and tubular body have corresponding non-circular outer configurations whereby the piston and tubular body undergo common rotation. The deformable material is contained in the casing between the piston and the tubular body.

In a second advantageous embodiment, the casing is constituted as two bowl-shape members having open ends and connected together, via external flanges, with their open ends in facing relation.

DETAILED DESCRIPTION

Figure 1:
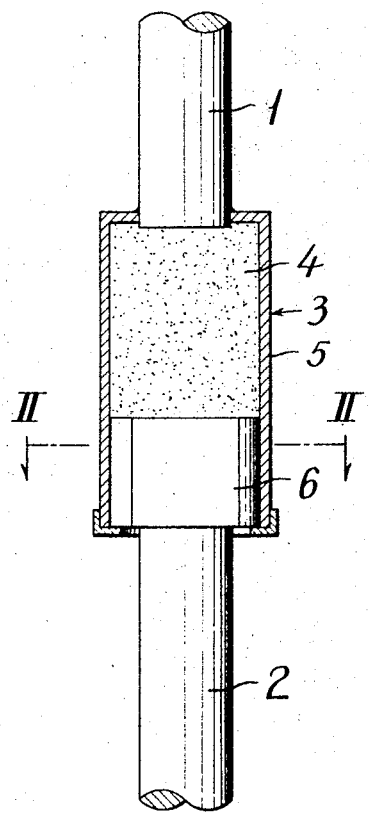
FIGURE 1 is a side view partly in section of one embodiment of the present invention.

In the drawing there is shown a steering column which is divided into at least two axial shaft portions 1 and 2 which are connected together by a casing 3 which is compressible in the longitudinal direction of the column under the action of an external force. Contained in the casing 3 is a material 4 which is plastically deformable under the action of a large compression force.

In the embodiment of FIG. 1, the casing 3 is composed of a tubular body 5 connected to the shaft portion 1 and a piston 6 connected to the shaft portion 2 and mounted slidably in said tubular body 5. The material 4 is contained in the casing 3 between the tubular body 5 and the piston 6. The material 4 may be largely deformed by a large compression force and has little restoring force, such as a sponge styrol, cork or the like. The tubular body 5 and the piston 6 have corresponding non-circular shapes so that relative rotation therebetween is prevented.

Figure 3:
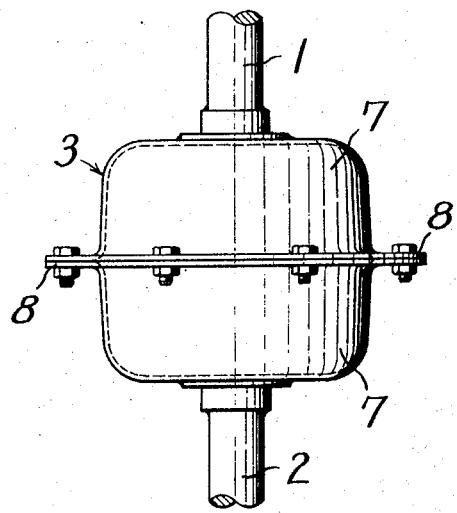
FIGURE 3 is a side view of another embodiment of the invention.
Figure 2:
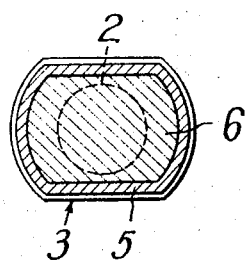
FIGURE 2 is a sectional view taken along line II—II in FIG. 1.
Figure 4:
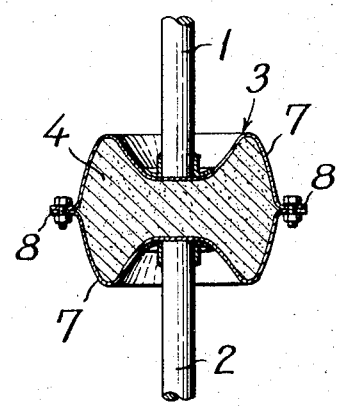
FIGURE 4 is a side view partly in section of the embodiment in FIG. 3 in deformed condition.

In the embodiment of FIG. 3 a pair of bowl-like members 7 are connected together at their respective end flanges 8 to form the casing 3, and contained therein is the material 4. It is desirable that the flanges 8 have the shape of wide circumferential flanges, as illustrated, because the connection of the two members 7 at such wide flanges can prevent the casing 3, when deformed, from being enlarged outwardly and cracked.

When a large shock force is applied to the steering column as in a collision, or the like, the casing 3 is compressed in the longitudinal direction of the steering column and, at the same time, the material 4 therein is also compressed, so that the shock is largely absorbed and thereby the impact with a person is lessened.

What is claimed is:

1. A steering column comprising first and second axial shaft portions, axially compressible means connecting said portions together for common rotation, the latter means defining an enclosure, and permanently deformable material in said enclosure resisting relative axial movement of said shaft portions towards one another until an axial force is applied to the column exceeding a predetermined value at which time the material is deformed.

2. A column as claimed in claim 1 wherein said axially compressible means comprises a casing.

3. A column as claimed in claim 2 wherein said casing comprises a tubular body connected to one of said shaft portions and a piston connected to the other shaft portion and slidably mounted in the tubular body.

4. A column as claimed in claim 3 wherein said permanently deformable material is in the casing between the piston and tubular body.

5. A column as claimed in claim 4 wherein said piston and tubular body have corresponding non-circular cross-sectional shapes.

6. A column as claimed in claim 2 wherein said casing comprises a pair of bowl shape members having open ends and connected together with their open ends in facing relation.

7. A column as claimed in claim 6 wherein said bowl shape members include external flanges, said members being secured together at said flanges.

8. A column as claimed in claim 6 wherein said permanently deformable material completely fills the bowl-shape members.

9. A column as claimed in claim 1 wherein said permanently deformable material is a sponge styrol.

References Cited

UNITED STATES PATENTS 2,724,463  11/1955  Becker _____ 188—1
3,380,557  4/1968  Peterson _____ 188—1

MILTON KAUFMAN, *Primary Examiner.*

U.S. Cl. X.R.

188—1